United States Patent
Wang et al.

(10) Patent No.: US 7,881,473 B2
(45) Date of Patent: Feb. 1, 2011

(54) QUANTUM KEY DISTRIBUTION SYSTEM AND METHOD

(75) Inventors: Shuoqin Wang, Westlake Village, CA (US); Daniel M. Zehnder, Los Angeles, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 889 days.

(21) Appl. No.: 11/753,940

(22) Filed: May 25, 2007

(65) Prior Publication Data

US 2008/0292102 A1 Nov. 27, 2008

(51) Int. Cl.
| | |
|---|---|
| H04L 9/00 | (2006.01) |
| H04L 9/28 | (2006.01) |
| H04L 29/06 | (2006.01) |
| H04L 9/32 | (2006.01) |
| G06F 12/14 | (2006.01) |

(52) U.S. Cl. .................. 380/263; 380/277; 380/44; 380/28; 713/150; 713/153; 713/168; 713/171; 713/189

(58) Field of Classification Search .................. 380/263, 380/277, 44, 28; 713/150, 153, 168, 171, 713/189
See application file for complete search history.

(56) References Cited

U.S. PATENT DOCUMENTS 7,620,182 B2 * 11/2009 Berzanskis et al. .......... 380/256

| | | | |
|---|---|---|---|
| 2004/0141618 A1* | 7/2004 | Lo et al. ................ | 380/278 |
| 2005/0135620 A1* | 6/2005 | Kastella et al. .......... | 380/256 |
| 2005/0152540 A1* | 7/2005 | Barbosa .................. | 380/28 |
| 2005/0190922 A1* | 9/2005 | LaGasse .................. | 380/278 |
| 2006/0120529 A1* | 6/2006 | Gisin et al. .............. | 380/256 |

OTHER PUBLICATIONS

Brassard et al., "Secret-Key Reconciliation by Public Discussion", Montreal, Canada 1998, Springer-Verlag, pp. 1-14 http://dsns.csie.nctu.edu.tw/research/crypto/HTML/PDF/E93/410.PDF.
Ribordy et al., "Automated "plug & play" quantum key distribution", Electronics Letters, Oct. 29, 1998, vol. 34, No. 22, pp. 2116-2117.

(Continued)

*Primary Examiner*—Aravind K Moorthy
(74) *Attorney, Agent, or Firm*—Yee & Associates, P.C.; Baldwin D. Quan (57) ABSTRACT

Method and system for transmitting optical clock signals and quantum key signals on a single optical channel. A multi-photon optical clock signal is received at an electro-optic switch at a first clock rate. The electro-optic switch may be configured for an interval defined by a second clock rate for generating a single photon quantum key signal. The multi-photon optical clock signal and the single photon quantum key signal are combined such that the single optical channel transmits the single photon quantum key signal at a first interval and the multi-photon optical clock signal at a second interval. The quantum key signal is transmitted from a transmitter at a first timing, and detected by a detector at a receiver. An output signal of the detector is sampled at a second timing that is delayed relative to the first timing for reducing quantum bit error rate.

36 Claims, 7 Drawing Sheets

OTHER PUBLICATIONS

Townsend et al., "Design of quantum cryptography systems for passive optical networks", Electronics Letters, Oct. 27, 1994, vol. 30, No. 22, pp. 1875-1877.

Lutkenhaus, "Estimates for practical quantum cryptography" Physical Review, vol. 59 No. 5, May 1999, pp. 3301-3320.

Bennett et al., "Generalized Privacy Amplification", IEEE Transactions on Information Theory, vol. 41, No. 6, Nov. 1995, pp. 1915-1924.

Karve et al., "Geiger Mode Operation of an In0.53Ga0.47As-In0.52A10.48As Avalanche Photodiode", IEEE Journal of Quantum Electronics, vol. 39, No. 10, Oct. 2003, pp. 1281-1287.

Begley, "Laser Cross-Link Systems and Technology", IEEE Communications Magazine, Aug. 2000, pp. 126-133.

Buttler et al., "Practical Free-Space Quantum Key Distribution over 1 km", The American Physical Society, Physical Review Letters, vol. 81, No. 15, Oct. 12, 1998, pp. 3283-3287.

* cited by examiner

QUANTUM KEY DISTRIBUTION SYSTEM AND METHOD

BACKGROUND INFORMATION

1. Field

The disclosure relates generally to a quantum key distribution system and, more particularly, to a method and system for transmitting optical clock signals and quantum key signals on a single optical channel in a free space quantum key distribution system, and for reducing quantum bit error rate in a free space quantum key distribution system.

2. Background

Quantum Key Distribution (QKD), which was first recognized in the early 1990s as a means to produce a random bit stream for encryption, has recently seen increased interest from both military and civil spheres as providing information assurance, creating a secure communications environment. In a QKD system, lasers are used to generate quantum mechanically coupled photon states. The nature of this coupling allows the photons to simultaneously exist in orthogonal modes. These orthogonal modes are typically manifested in optical polarization, with orthogonal modes being vertical and horizontal linear or left and right circular. The random nature of the quantum mechanical process will randomly, with equal probability, cause measurement of one orthogonal state or the other. With an assignment of bit value "0" or "1" to one polarization state measurement, a truly random bit stream will be generated. The stream may be referred to as a "key", according to present encryption architectures. As this key is represented by a quantum state, it is referred to as "quantum signals" or "quantum key signals."

Essential to the security of the quantum key transmission is that a quantum state cannot be cloned, and that a quantum state cannot be identified without being disturbed. In a typical QKD protocol, the transmitter and receiver randomly select their basis set (for example, vertical vs. horizontal polarization) before each photon is detected. After transmission of the key, the receiver and transmitter compare basis sets, to assess whether a given measurement was made with orthogonal detection. Statistically, half of the settings will be wrong and the corresponding signals discarded. Half of the transmitter/receiver mode will be correct, and the transmitter/receiver will keep that bit. After some predetermined length of key has been collected, depending on the application in question, the transmitter and the receiver will have the same encryption key, which is then used for transmission of secure data.

QKD in free space (FS) may become a crucial technique for a secure space-air-ground information network. In a free space QKD system, a transmitter sends keys via single photons to a receiver through free space to be detected by a single photon detector (SPD) at a receiver. As in any digital signal transmission system, clock recovery and synchronization between the transmitter and the receiver are required for proper operation.

Currently, clock recovery and synchronization in a free space QKD system are realized by establishing a second optical path, sometimes called a "classical channel", to transmit optical pulses. This classical channel needs to synchronize with the quantum channel that carries the quantum key signals in order to achieve synchronization between the transmitter and the receiver.

It is known in a conventional optical communications mechanism, including a transmitter and receiver, that optical transmission modules be included to transmit clock signals. The classical and quantum channel have fundamentally distinct tasks. Therefore, there must be physical mechanisms to assure the distinction between photons in each channel. At the same time, the transmitter and receiver may be physically co-located, requiring co-incident or nearly co-incident physical optical paths. With synchronization pulses at the nano-joule level, there is an 8 to 9 order of magnitude difference between synchronization and quantum channel signal strengths. One way to separate the signals is wavelength multiplexing, with the two channels transmitting at different optical wavelengths.

Since the classical channel and the quantum channel may use different wavelengths, it is also known to transmit both the classical signals and the quantum signals via the same optical path. The two signals can be combined and separated by wavelength division techniques, with combining or separation accomplished with techniques including but not limited to prismatic, grating, or interferometric hardware.

The quantum channel, however, is very sensitive to noise inasmuch as single photon detectors (SPDs) must be tuned to be extremely sensitive in order to be able to respond to single photons. Stray photons from the synchronization or other external source can easily obscure the quantum channel signal. As a result, substantial care is required to effectively isolate the SPD from excitation by the classical signals. This results in the need for a QKD system that has relatively complex hardware, increased environmental sensitivity and that is of substantial size and weight.

Also, in a free space QKD system, quantum states are prone to be lost due to factors such as transmission losses, de-coherence, and interruptions from a potential eavesdropper. Accordingly, an important criterion in evaluating a free space QKD system is its quantum bit error rate (QBER).

In order to achieve an acceptable QBER, the photon source in current QKD systems includes a cooled laser diode or a VCSEL (Vertical Cavity Surface Emitting Laser) driven by a customized laser driver to produce sharp laser pulses (<1 ns), in conjunction with a pseudo random number generator to produce arbitrary quantum keys. Such a photon source, however, is fairly complicated and contributes to providing a relatively complex QKD system. A photon source that is composed of only two, relatively low cost, commercially available, off-the-shelf parts, specifically, a single mode VCSEL and a data generator, would be simple and modular in construction and provide a QKD system that is robust and of reduced size and weight.

In current QKD systems, in order to maximize the probability that a received quantum key signal accurately corresponds to a transmitted quantum key signal and to minimize QBER, the photon source in the transmitter and the SPD in the receiver are synchronized such that the SPD detects the received quantum key signal at a timing that corresponds to the timing of the transmitted quantum key signal. A pulse produced by a single mode VCSEL, however, may have a relatively long tail (e.g., greater than about 8 ns). The length of the tail, in fact, may be longer than the sampling period of the SPD with the result being that the SPD may detect the photon emitted at the tail and produce an erroneous output signal. Such detection errors can result in the QKD system having an unacceptably high QBER.

There is, accordingly, a need for improved mechanisms for achieving clock recovery and synchronization and for reducing quantum bit error rate in a free space quantum key distribution system, such as a free space quantum key distribution system utilizing a single mode VCSEL as a photon source.

SUMMARY

An embodiment of the disclosure provides a method for transmitting optical clock signals and quantum key signals on a single optical channel in a quantum key distribution system. The method includes receiving a multi-photon optical clock signal at an electro-optic switch at a first clock rate. The electro-optic switch may be configured for an interval defined by a second clock rate for generating a single photon quantum key signal. The multi-photon optical clock signal and the single photon quantum key signal may be combined such that the single optical channel transmits the single photon quantum key signal at a first interval and transmits the multi-photon optical clock signal at a second interval.

A further embodiment of the disclosure provides a quantum key distribution system. The quantum key distribution system includes a transmitter, a receiver, and a single optical channel for transmitting an optical clock signal and a single photon quantum key signal between the transmitter and the receiver. A first electro-optic switch on the transmitter may be provided for receiving an optical clock signal at a first clock rate and may be configurable for generating a single photon quantum key signal from the optical clock signal for transmission at a first interval, and configurable for transmitting the optical clock signal at a second interval. A second electro-optic switch on the receiver may be provided for receiving the single photon quantum key signal and the optical clock signal. The second optical switch may be configurable for directing the single photon quantum key signal to a photon detector at the first interval and configurable for directing the optical clock signal to a clock recovery unit at the second interval.

A further embodiment of the disclosure provides a method for transmitting optical clock signals and quantum key signals on a single optical channel between a transmitter and a receiver in a quantum key distribution system. The method includes combining a multi-photon optical clock signal and a single photon quantum key signal at the transmitter to provide a combined signal, and transmitting the combined signal to the receiver on the single optical channel wherein the single photon quantum key signal is transmitted to the receiver at a first interval and the multi-photon optical clock signal is transmitted to the receiver at a second interval. The combined signal is received at the receiver and separated to provide the multi-photon optical clock signal and the single photon quantum key signal at the receiver, and the single photon quantum key signal at the receiver is directed to a single photon detector at the first interval, and the multi-photon optical clock signal at the receiver is directed to a clock recovery unit at the second interval.

A further embodiment of the disclosure provides a method and system for reducing quantum bit error rate in a quantum key distribution system. The method includes transmitting a quantum key signal from a transmitter at a first timing, and detecting the transmitted quantum key signal by a detector at a receiver. An output signal of the detector is sampled at a second timing that is delayed relative to the first timing.

A further embodiment of the disclosure provides a quantum key distribution system. The quantum key distribution system includes a transmitter for transmitting a quantum key signal at a first timing, and a receiver having a detector for detecting the transmitted quantum key signal. The system further includes a sampling time delay mechanism for sampling an output signal of the detector at a second timing that is delayed relative to the first timing.

A further embodiment of the disclosure provides a method for reducing quantum bit error rate in a free space quantum key distribution system. The method includes transmitting a quantum key signal from a transmitter across free space to a receiver at a first timing, and detecting the transmitted quantum key signal by a single photon detector at the receiver. An output signal of the single photon detector is sampled at a second timing that is delayed relative to the first timing.

The features, functions, and advantages can be achieved independently in various embodiments or may be combined in yet other embodiments.

BRIEF DESCRIPTION OF THE DRAWINGS

The novel features believed characteristic of the embodiments are set forth in the appended claims. The invention itself, however, as well as a preferred mode of use, further objectives and advantages thereof, will best be understood by reference to the following detailed description of advantageous embodiments when read in conjunction with the accompanying drawings.

DETAILED DESCRIPTION

Figure 1:
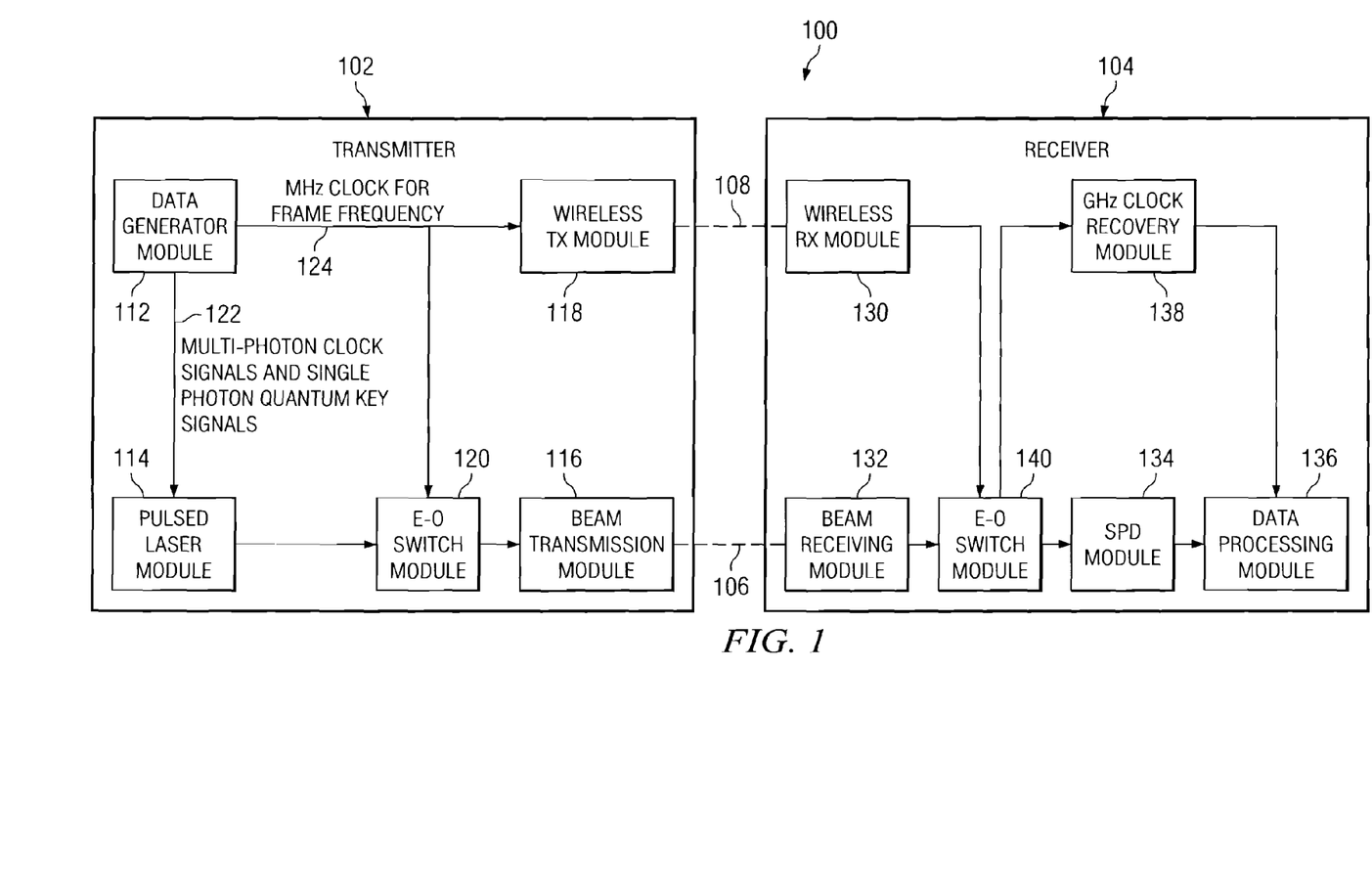
FIG. 1 is an illustration of a free space quantum key distribution system in accordance with an advantageous embodiment of the disclosure.

With reference now to the figures, and, in particular, with reference to FIG. 1, an illustration of a free space quantum key distribution system in accordance with an advantageous embodiment of the disclosure is depicted. The free space quantum key distribution (QKD) system is designated by reference number 100, and may include transmitter 102 and receiver 104 capable of optically communicating with one another across free space via a single optical channel schematically illustrated at 106, and via a wireless communications link schematically illustrated at 108.

Transmitter 102 may include data generator module 112, pulsed laser module 114, beam transmission module 116, wireless transmitter module 118 and electro-optic (E-O) switch module 120. Data generator module 112 produces random bits (raw keys). The random bits may be generated, for example, by a pseudo-random number generator or by a real quantum random number generator. A pseudo-random number generator is based on an appropriate algorithm, and is normally integrated in low cost, commercially available data generators.

Pulsed laser module 114 may be modulated by data generator module 112 to produce optical pulses. More particularly, as illustrated in FIG. 1, and as will be explained more fully hereinafter, the optical pulses produced by pulsed laser module 114 enable transmission of both multi-photon clock signals and single photon quantum key signals (designated by reference number 122 in FIG. 1) to receiver 104 via single optical channel 106.

Pulsed laser module 114 may include one or more VCSELs (Vertical-Cavity Surface-Emitting Lasers), each pigtailed with a single mode optical fiber. A single mode beam may be preferred to keep beam coupling losses low. The number of lasers in pulsed laser module 114 may depend on the particular protocol employed in the QKD system. Current QKD systems, for example, operate under protocols utilizing two or four lasers, and advantageous embodiments can be incorporated into QKD systems operating under either protocol. It should also be understood, however, that advantageous embodiments are not limited to any particular QKD system protocol or to systems using any particular kind or number of lasers.

The laser pulses from the lasers of pulsed laser module 114 are combined in beam transmission module 116 before leaving transmitter 102. Beam transmission module 116 may include various optical beam control mechanisms including polarization beam splitters, non-polarization beam splitters, collimators and the like to control the laser beam leaving transmitter 102. As will be explained hereinafter, at particular time intervals, the laser beam leaving transmitter 102 will comprise one photon carrying either "0" or "1" bit of information represented by its polarization states. Beam transmission module 116 may be of conventional construction as used in current QKD systems, and is thus not described in any detail herein.

Wireless transmitter module 118 may be used to transmit an electrical frame clock signal 124, for example, a MHz signal, to receiver 104 via wireless communications link 108 so that both the transmitter and the receiver will operate on the same clock. In a QKD system, the transmitter and the receiver must exchange information in order to fulfill the key distribution. For example, the receiver may need to inform the transmitter on which address it receives a signal, and the transmitter needs to inform the receiver on which address the signal can be saved or discarded. Since this type of information will not expose the quantum key information carried by the optical signal via optical channel 106, security is not hindered by this type of information also being transmitted via wireless communications link 108. The speed of this classical information exchange does not have to be high as long as it is no lower than the raw key reception rate. For example, if the transmitter operates at a GHz key transmission rate, the rule of thumb is that the reception rate is 30 dB low in free space, which is a MHz rate. Wireless communications link 108 is easily capable of transmitting MHz information, and wireless transmitter module 118 may be used to transmit clock signals 124 to synchronize electro-optic switches in both the transmitter and the receiver, as will be described hereinafter, and may also be used to transmit other non-secure type information between the transmitter and receiver.

Receiver 104 may include wireless receiver module 130, beam receiving module 132, single photon detector (SPD) module 134, data processing module 136, clock recovery module 138, and electro-optic switch module 140.

Wireless receiver module 130 may receive the MHz electrical clock signal transmitted by wireless transmitter module 118 in transmitter 102 and may use this signal to synchronize the operation E-O switch module 140 with the operation of E-O switch module 120 in transmitter 102, and may also receive and transmit address information and the like as described above. Beam receiving module 132 may receive the optical signal sent by transmitter 102 via single optical channel 106, and may be similar to beam transmission module 116 in transmitter 102 in terms of hardware in that it also may include appropriate polarization beam splitters, non-polarization beam splitters, collimators and the like to control the received optical beam. Beam receiving module 132 may also be of conventional construction as used in current QKD systems, and is thus not described in any detail.

Clock recovery module 138 may receive periodic optical GHz clock signals via E-O switch 140 and recovers the GHz clock to be used as an external clock reference for data processing module 136. Data processing module 136 may receive raw quantum keys from SPD module 134 at each time slot triggered by the clock fed by clock recovery module 138. Data processing module 136 may synchronize the transmitter and the receiver so that they can refer to the same address by using the clock recovery and synchronization mechanism according to advantageous embodiments of the disclosure. Data processing module 136 may also sift out the valid keys with the help of the exchange of classical information transmitted via wireless communications link 108.

Figure 2:
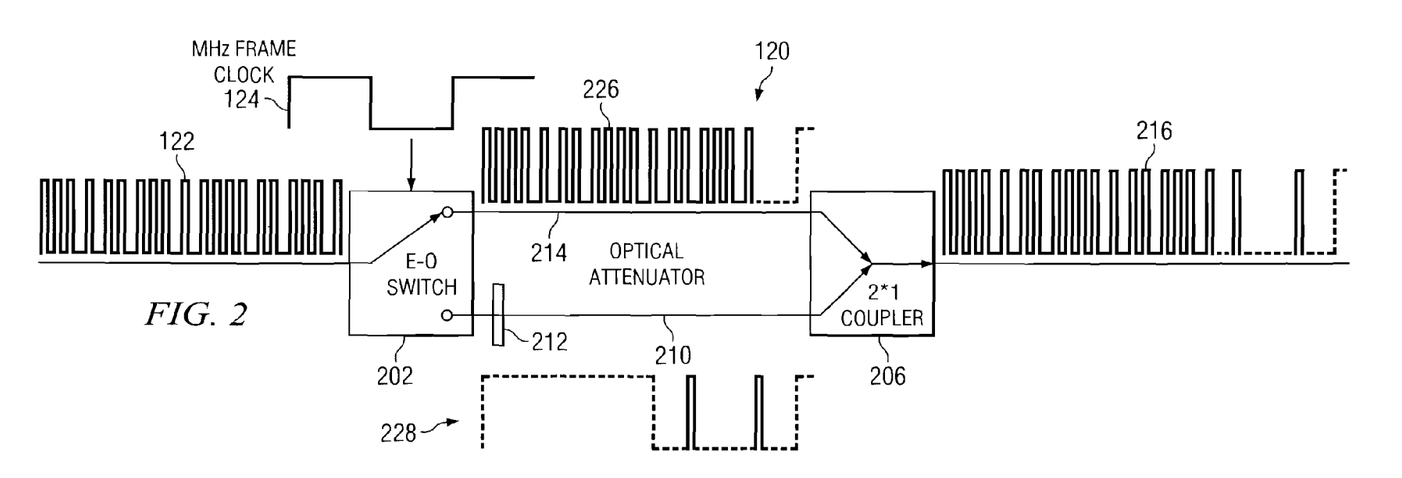
FIG. 2 is an illustration showing details of the electro-optic switch module in the transmitter of FIG. 1 in accordance with an advantageous embodiment of the disclosure.
Figure 3:
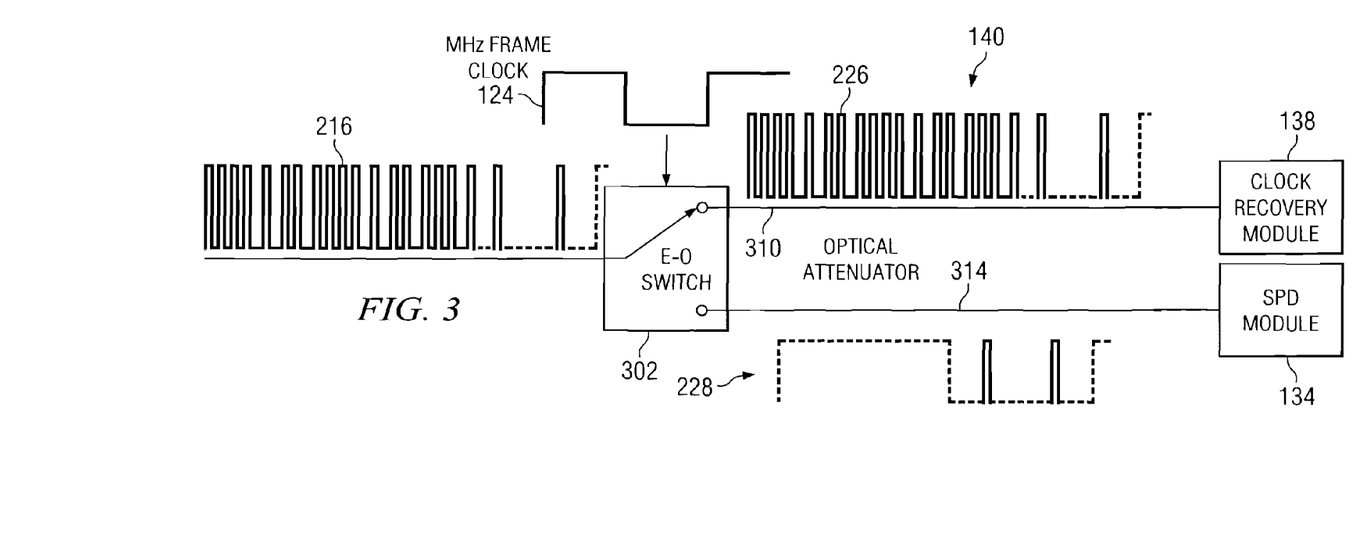
FIG. 3 is an illustration showing details of the electro-optic switch module in the receiver of FIG. 1 in accordance with an advantageous embodiment of the disclosure.

Electro-optic (E-O) switch module 140 in receiver 104, in conjunction with electro-optic (E-O) switch module 120 in transmitter 102, enables the elimination of a separate optical channel for transmitting clock signals. FIG. 2 is an illustration showing details of electro-optic switch module 120 in transmitter 102 of FIG. 1 in accordance with an advantageous embodiment of the disclosure, and FIG. 3 is an illustration showing details of electro-optic switch module 140 in receiver 104 of FIG. 1 in accordance with an advantageous embodiment of the disclosure With reference to FIG. 2, the input of E-O switch module 120 in transmitter 102 is a multi-photon GHz optical signal 122 produced by pulsed laser module 114 as modulated by data generator module 112. In the period of one frame, E-O switch 202 of E-O switch module 120, the timing of which is controlled by MHz frame clock signal 124, separates input optical signal 122 into two paths 210 and 214. Along path 210, the signal is attenuated by attenuator 212 to a single photon optical signal 228, i.e., each pulse includes no more than one photon. The optical signal traveling along the path 214 is left unchanged as a multi-photon optical signal 226.

As will be explained hereinafter, the single photon optical signal 228 traveling along path 210 is utilized as a single photon quantum key signal, and the multi-photon optical signal traveling along path 214 is utilized as an optical clock signal. Signals 226 and 228 are then combined in 2*1 optical coupler 206 of E-O switch module 120 so that optical channel 106 transmits multiple photons at one time interval and single photons at another time interval as represented by combined output optical signal 216. The ratio between these two intervals can be adjusted within one period based on requirements of the system. More intervals may be needed for the multi-photon transmission when the optical clock needs more signals to stabilize the PLL (phase-lock-loop), or it may be necessary to increase the time for single photon transmission in order to increase the key reception rate.

FIG. 3 is an illustration showing details of electro-optic switch module 140 in receiver 104 of FIG. 1 in accordance with an advantageous embodiment of the disclosure. E-O switch module 140 may be similar to E-O switch module 120 in transmitter 102. E-O switch 302, the timing of which is also controlled by MHz frame clock signal 124 transmitted from the transmitter to the receiver via wireless communications link 108, divides the optical beam 216 received from transmitter 102 back into multi-photon optical clock signal 226 along path 310 to clock recovery module 138, and into single photon quantum key signal 228 along path 314 to SPD module 134. It should be noted here that any jitter of MHz frame clock 124 can be easily tolerated because the jitter will only affect the relative phase difference between transmitter and receiver signals.

The keys transmitted from the transmitter and the keys received by the receiver need to be synchronized so that they can be referred to the same address. In accordance with advantageous embodiments, this is achieved by correlation between the bit error rates of the SPD and the relative difference of the addresses between the transmitter and the receiver. For example, the receiver may ask the transmitter to submit the key as well as its address information via wireless communications link 108 (these keys are only used for synchronization and will be discarded later), and then to measure the bit error rates as a function of the relative address difference based on the keys and addresses received by the SPD module 134. It has been found that the correlation is very sharp even though the reception rate is low.

Figure 4:
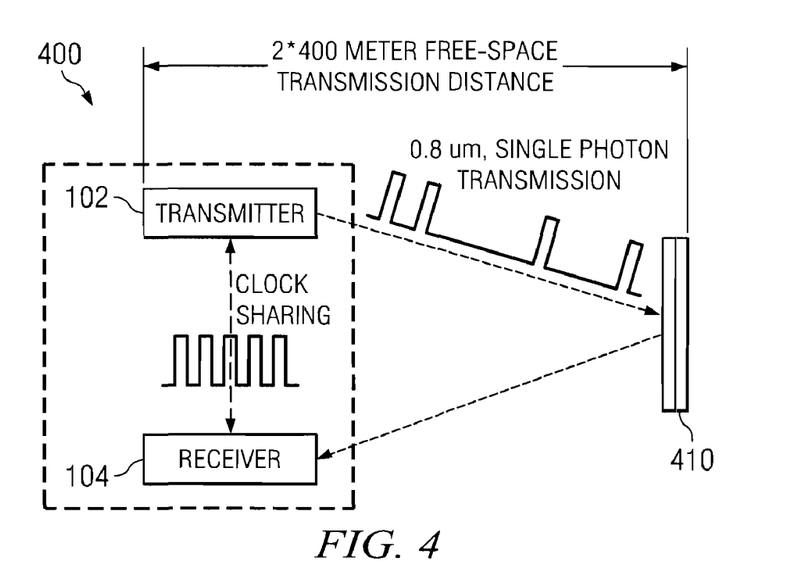
FIG. 4 is an illustration of an implementation of a free space quantum key distribution system in accordance with an advantageous embodiment of the disclosure.
Figure 5:
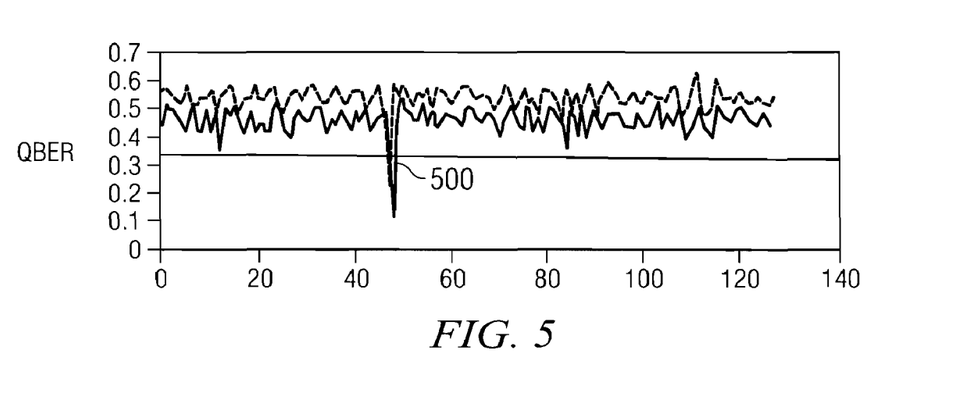
FIG. 5 is an illustration of a graph showing a reduction in quantum bit error rate achieved in a test utilizing the free space quantum key distribution system illustrated in FIG. 4.

FIG. 4 is an illustration of an implementation of a free space quantum key distribution system in accordance with an advantageous embodiment of the disclosure. The system is generally designated by reference number 400, and in the illustrated implementation, transmitter 102 transmits signals to receiver 104 via an optical path that includes relay mirror 410. The free space transmission distance was 800 meters. The transmitter and the receiver shared the same clock as described above. The quantum bit error rate (QBER) was tested and results are illustrated in FIG. 5. In particular, FIG. 5 is an illustration of a graph showing a reduction in quantum bit error rate achieved in a test utilizing the free space quantum key distribution system illustrated in FIG. 4. As shown, a clear drop in bit error rate occurs at position 500 when the keys from the transmitter and the receiver were synchronized utilizing the synchronization mechanism in accordance with an advantageous embodiment of the disclosure.

Figure 6:
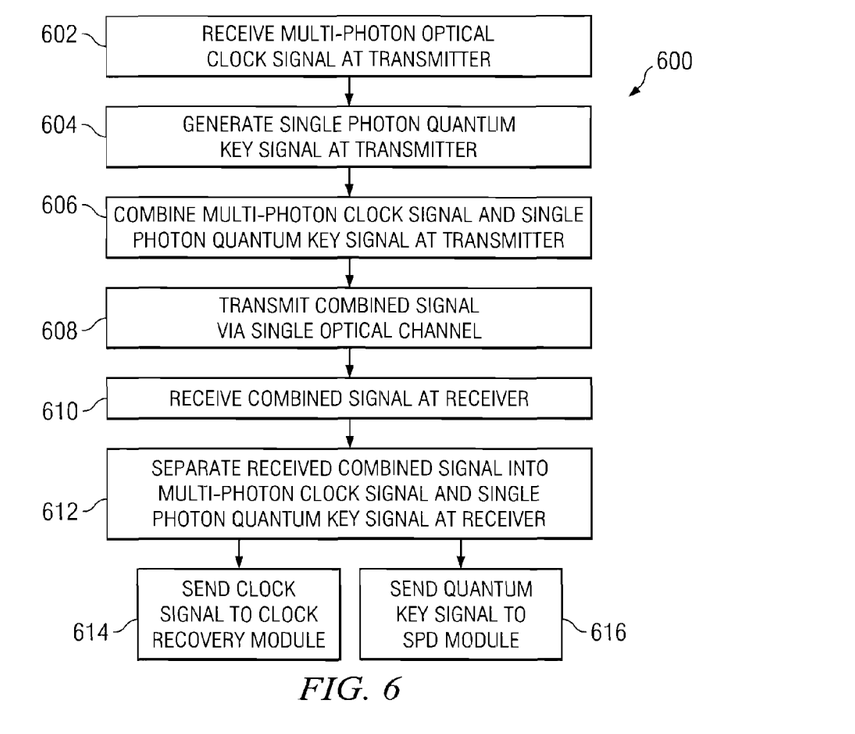
FIG. 6 is a flowchart that illustrates a method for transmitting optical clock signals and quantum key signals on a single optical channel in a free space quantum key distribution system in accordance with an advantageous embodiment of the disclosure.

FIG. 6 is a flowchart that illustrates a method for transmitting optical clock signals and quantum key signals on a single optical channel in a free space quantum key distribution system in accordance with an advantageous embodiment of the disclosure. The method is generally designated by reference number 600 and begins by receiving a multi-photon optical clock signal at a transmitter (Step 602). A single photon quantum key signal is also generated at the transmitter (Step 604). As indicated previously, this single photon quantum key signal may be generated from the multi-photon optical clock signal.

The multi-photon optical clock signal and the single photon quantum key signal may then be combined at the transmitter (Step 606), and the combined signal is transmitted via a single optical channel across free space (Step 608). The combined multi-photon clock signal and single photon quantum key signal may be received at a receiver (Step 610). The received signal is then separated into the multi-photon clock signal and the single photon quantum key signal at the receiver (Step 612). The multi-photon clock signal is sent to a clock recovery module for clock recovery (Step 614), and the single photon quantum key signal is sent to an SPD module for detection and post processing (Step 616).

Figure 7:
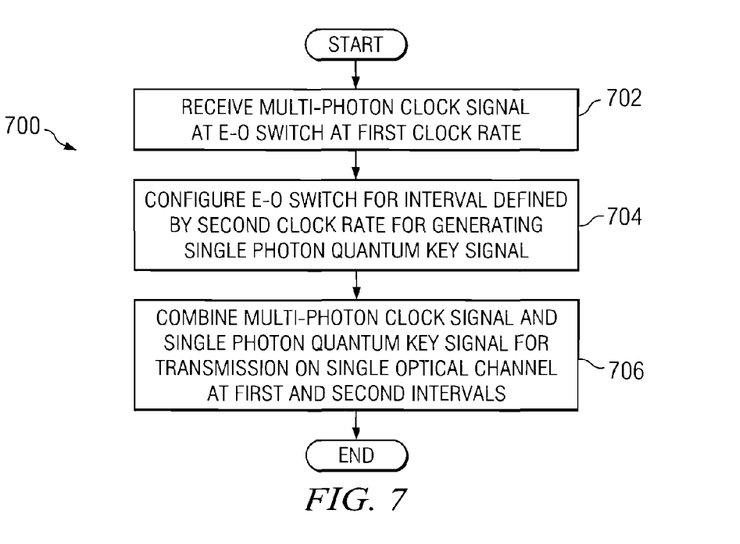
FIG. 7 is a flowchart that illustrates a method for transmitting optical clock signals and quantum key signals on a single optical channel in a quantum key distribution system in accordance with an advantageous embodiment of the disclosure.

FIG. 7 is a flowchart that illustrates a method for transmitting optical clock signals and quantum key signals on a single optical channel in a quantum key distribution system in accordance with an advantageous embodiment of the disclosure. The method is generally designated by reference number 700 and begins by receiving a multi-photon optical clock signal at an electro-optic switch at a first clock rate (Step 702). The electro-optic switch is configured for an interval defined by a second clock rate for generating a single photon quantum key signal (Step 704), and the multi-photon optical clock signal and the single photon quantum key signal are combined such that the single optical channel transmits the single photon quantum key signal at a first interval and transmits the multi-photon optical clock signal at a second interval (Step 706).

Figure 8:
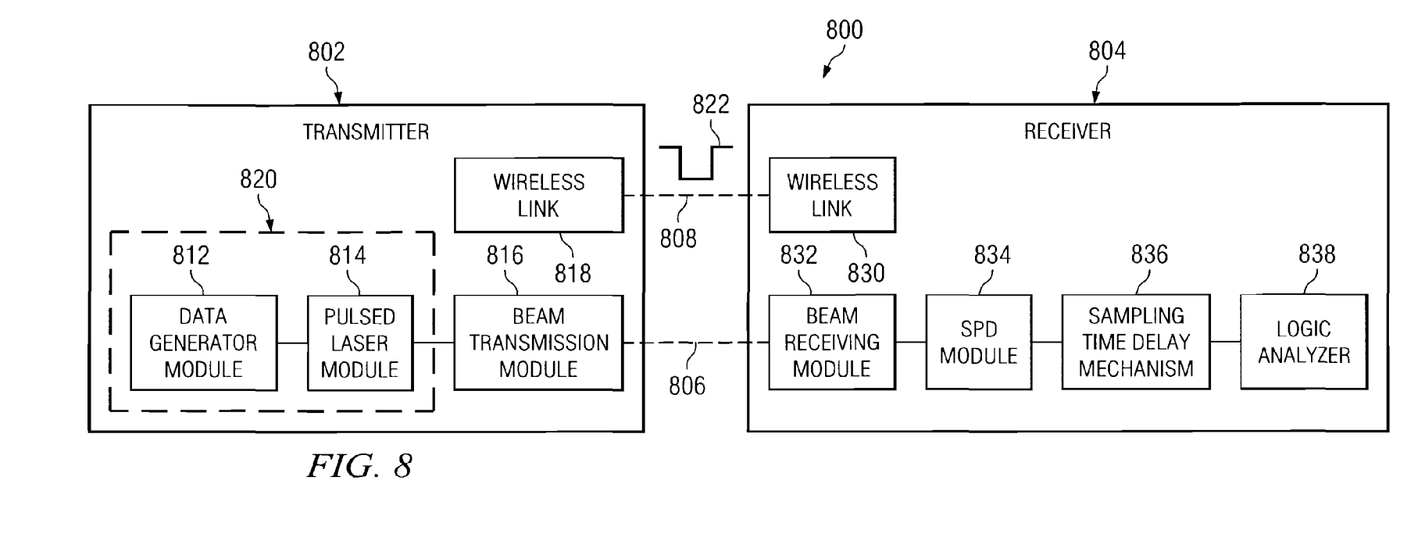
FIG. 8 is an illustration of a free space quantum key distribution system in accordance with an advantageous embodiment of the disclosure.

FIG. 8 is an illustration of a free space quantum key distribution system in accordance with a further advantageous embodiment of the disclosure. The free space quantum key distribution (QKD) system is generally designated by reference number 800, and includes transmitter 802 and receiver 804 capable of communicating with one another across free space via an optical channel schematically illustrated at 806, and via a wireless communications link schematically illustrated at 808.

Transmitter 802 may include data generator module 812, pulsed laser module 814, beam transmission module 816 and wireless link 818. Data generator module 812 produces random bits (raw keys). The random bits may be generated, for example, by a pseudo-random number generator or by a real quantum random number generator. A pseudo-random number generator based on an appropriate algorithm may be preferred in an advantageous embodiment; as such a generator is normally integrated in low cost, commercially available data generator modules.

Pulsed laser module 814 may be modulated by data generator module 812 to produce optical pulses. In the advantageous embodiment described herein, pulsed laser module 814 is a 4.25 GHz VCSEL pigtailed with a single mode fiber, and data generator module 812 is a 1 GHz data generator that directly drives the VCSEL. The data generator and the laser module together comprise a photon source 820 that may be assembled using commercially available components, and that is simple in design and low in cost. It should be understood, however, that it is not intended to limit advantageous embodiments to any particular type of photon source using any particular type of data generator or laser source.

Beam transmission module 816 may include various optical beam controls including polarization beam splitters, non-polarization beam splitters, collimators and the like to provide control over the laser beam generated by photon source 820 and transmitted from transmitter 802 via optical channel 806. Beam transmission module 816 may be of conventional construction as used in current QKD systems, and is thus not described in any detail herein.

Wireless link 818 may be used to transmit an electrical frame clock signal 822 in order to synchronize operations of transmitter 802 and receiver 804, and may also be used to transmit and receive other information to and from the receiver.

Receiver 804 may include wireless link 830, beam receiving module 832, single photon detector (SPD) module 834, sampling time delay mechanism 836, and logic analyzer 838.

Wireless link 830 may receive the electrical frame clock signal 822 transmitted by wireless link 818 in transmitter 802, and may also be used to transmit and receive other information to and from transmitter 802. Beam receiving module 832 may be similar to beam transmission module 816 in transmitter 802 in terms of hardware in that it may also include appropriate polarization beam splitters, non-polarization beam splitters, collimators, and the like to control the laser beam received from transmitter 802 via optical channel 806. Beam receiving module 832 may also be of conventional construction as used in current QKD systems, and is thus not described in any detail.

SPD module 834 detects single photons transmitted from the transmitter to the receiver via optical channel 806 and received by beam receiving module 832. Logic analyzer 838 may receive and process the SPD output. In an advantageous embodiment, the logic analyzer comprises an Agilent 1 GHz logic analyzer marketed by Agilent Technologies, Inc. As will be explained hereinafter, receiver 804 also includes sampling time delay mechanism 836 to delay the sampling time of the output signal from SPD 834 in order to reduce QBER of QKD system 800.

Figure 9:
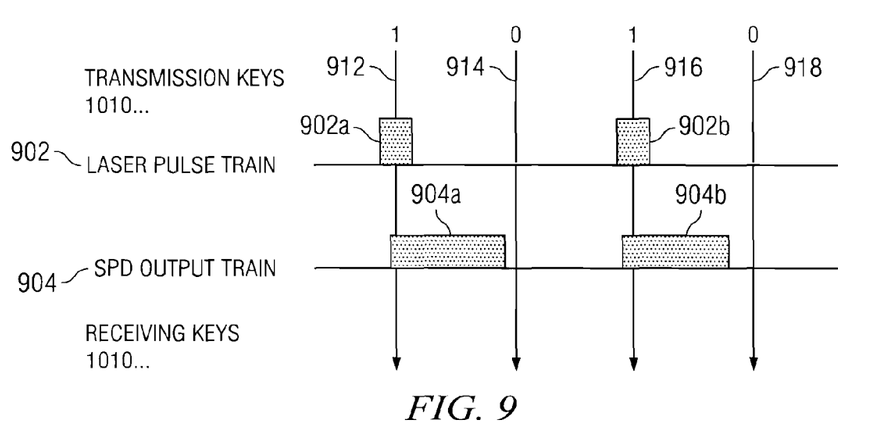
FIG. 9 is an illustration of a graph schematically showing a laser pulse train carrying a quantum key signal, and a corresponding single photon detector output signal train that are well aligned to a sampling clock to assist in explaining advantageous embodiments of the disclosure.

In a well-designed QKD system, the laser pulses generated by pulsed laser module 814 in transmitter 802 and the output pulses from SPD module 834 are well aligned with respect to one another by virtue of electrical frame clock signal 822 transmitted from transmitter 802 to receiver 804 via wireless communication link 806. FIG. 9 is an illustration of a graph schematically showing a laser pulse train carrying a quantum key signal, and a corresponding single photon detector output signal train that are well aligned to a sampling clock to assist in explaining advantageous embodiments of the disclosure. In particular, FIG. 9 schematically illustrates a laser pulse train 902 for transmitting keys "1010" at clock timings represented by vertical lines 912, 914, 916 and 918, respectively. The corresponding SPD output pulse train is shown at 904. As can be seen, the pulses 902a and 902b (rise times) of input laser pulse train 902 representing binary "1" and the output pulses 904a and 904b (rise times) of SPD output train 904 representing binary "1" are both well-aligned with the clock timings 912 and 916, respectively, resulting in SPD detector accurately detecting keys "1010" at sampling times 912-918.

As indicated previously, however, current QKD systems are fairly complicated in that they typically include a photon source that includes a cooled laser diode or a VCSEL driven by a customized laser driver. The QKD system illustrated in FIG. 8, however, may be composed of only two relatively low cost and commercially available parts, a data generator, and a single mode VCSEL. Such a QKD system is simple and modular in construction, potentially more robust and may be of reduced size and lighter in weight than current QKD systems. A laser pulse produced by this simple mechanism, however, may have a relatively long tail. As a result, if the SPD in the receiver of the QKD system happens to catch the photon emitted at the tail, an erroneous output signal may be produced.

Figure 10:
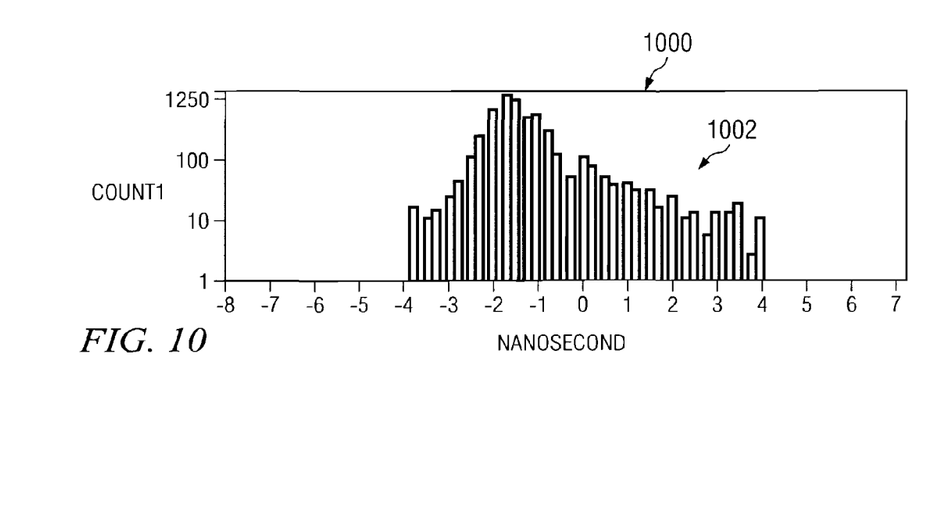
FIG. 10 illustrates a histogram of an output pulse from a single photon detector and sampled by a logic analyzer in a quantum key distribution system that utilizes a single mode VCSEL photon source to assist in explaining advantageous embodiments of the disclosure.

FIG. 10 illustrates a histogram of an output pulse from a single photon detector and sampled by a logic analyzer in a quantum key distribution system that utilizes a single mode VCSEL photon source to assist in explaining advantageous embodiments of the disclosure. It can be clearly seen that pulse 1000 has quite a long tail as shown at 1002. As mentioned previously, a photon from the tail may trigger the SPD and be read out at the next sampling time, e.g., at a time when a binary "0" should be detected, and result in an erroneous output signal. Such a situation is illustrated in FIG. 11.

Figure 11:
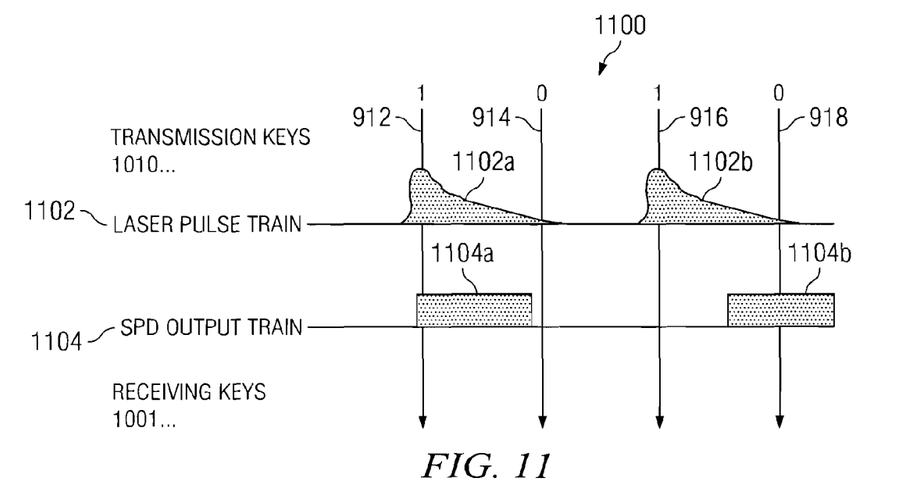
FIG. 11 is an illustration of a graph schematically showing a laser pulse train carrying a quantum key signal, and a corresponding single photon detector output signal train in a quantum key distribution system having a single mode VCSEL photon source driven by a data generator to assist in explaining advantageous embodiments of the disclosure.

In particular, FIG. 11 is an illustration of a graph schematically showing a laser pulse train carrying a quantum key signal, and a corresponding single photon detector output signal train in a quantum key distribution system having a single mode VCSEL photon source driven by a data generator to assist in explaining advantageous embodiments of the disclosure. As shown, laser pulse train 1102 again transmits a signal representing transmission keys "1010" at timings 912, 914, 916, and 918. Now, however, the pulses 1102a and 1102b (rise times) representing binary "1" at times 912 and 916 are not sharp but have tails which may extend to the timings 914 and 918 at which the signal is intended to represent binary "0". As a result, the SPD output train may incorrectly detect a photon at one or both of sampling times 914 and 918. FIG. 11 illustrates that the SPD has detected a photon at sampling time 918 rather than at sampling time 916 such that the pulses 1104a and 1104b of output pulse train 1104 incorrectly represent receiving keys "1001".

Thus, FIG. 11 illustrates that a QKD system having a single mode VCSEL driven by data generator module 812 illustrated in FIG. 8 may result in a QKD system having an unacceptably high QBER.

Figure 12:
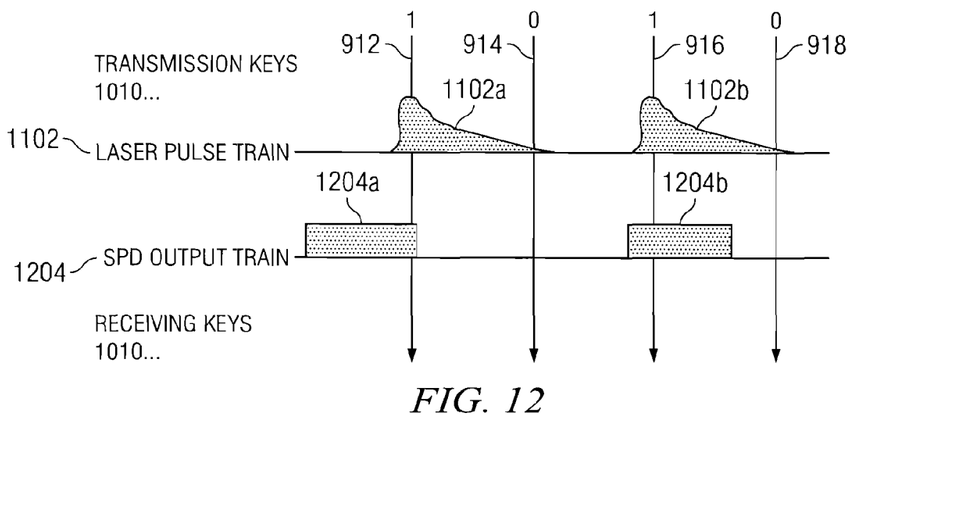
FIG. 12 is an illustration of a graph schematically showing a laser pulse train carrying a quantum key signal, and a corresponding single photon detector output signal train in a quantum key distribution system having a single mode VCSEL photon source driven by a data generator and incorporating a sampling time delay mechanism in accordance with an advantageous embodiment of the disclosure.

In accordance with advantageous embodiments, however, QBER can be significantly reduced by delaying the sampling times of the SPD output. FIG. 12 is an illustration of a graph schematically showing a laser pulse train carrying a quantum key signal, and a corresponding single photon detector output signal train in a quantum key distribution system having a single mode VCSEL photon source driven by a data generator and incorporating a sampling time delay mechanism in accordance with an advantageous embodiment of the disclosure. As shown in FIG. 12, the input laser pulse train 1102 representing transmission keys "1010" still has pulses (rise times) at timings 912 and 916 having tails which may extend to timings 914 and 918. The sampling times of the SPD output train 1204, however, have now been delayed such that pulses 1204a and 1204b (rise times) of SPD output pulse train 1204 representing binary "1" are properly aligned only with delayed sampling times 912 and 916 and are not aligned with delayed sampling times 914 and 918. As a result, photons will be detected only at delayed sampling times 912 and 916 resulting in that the SPD output will accurately represent the keys "1010" that were transmitted.

As shown in FIG. 8, and in accordance with an advantageous embodiment, receiver 804 of QKD system 800 includes sampling time delay mechanism 836 to delay the sampling time of the SPD output. Sampling time delay mechanism 836 may be implemented in various ways using hardware or software, and it should be understood that it is not intended to limit advantageous embodiments to any particular type of sampling time delay mechanism. One example of a hardware implementation that may be used is an electrical circuit having one or more capacitors to provide the delay. Physical delay lines such as optical fibers and electrical cables may also be used to provide the delay. An example of a software implementation may include software that samples the signals and reproduces them at a later time.

In accordance with an advantageous embodiment, the extent of the delay in sampling the output of the single photon detector may be such that the rise times of the single photon detector output are totally contained inside a boundary that is defined by a preceding sampling time and a subsequent sampling time. In this way, any tail of the laser pulse will not extend to the subsequent sampling time such that a photon might be erroneously detected at the subsequent sampling time.

Tests performed on a QKD system such as illustrated in FIG. 8 having a single mode VSCEL photon source and incorporating a sampling time delay mechanism, have been shown to have a QBER of no more than about 0.5 percent which is significantly better than in many current QKD systems.

Figure 13:
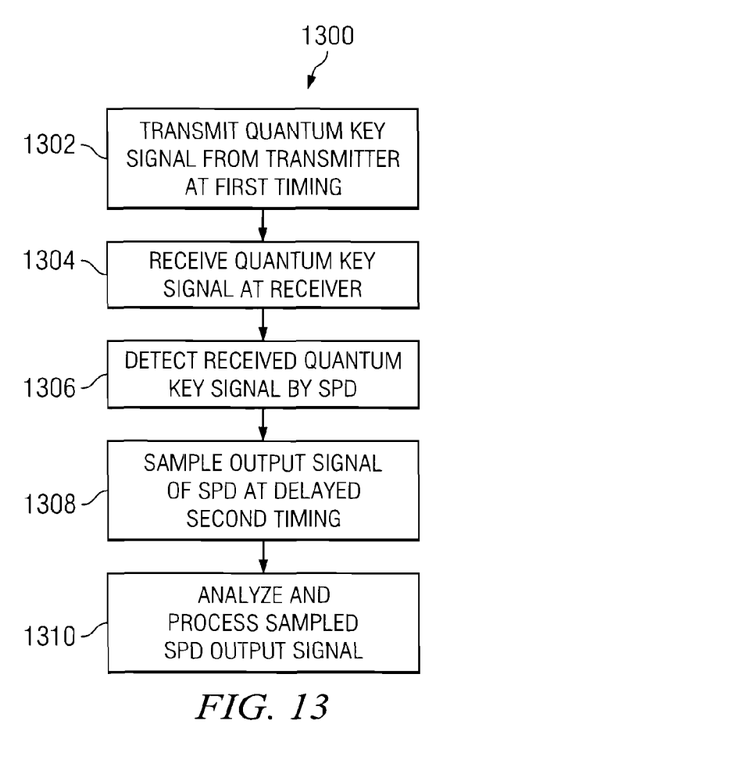
FIG. 13 is a flowchart that illustrates a method for reducing quantum bit error rate in a quantum key distribution system in accordance with an advantageous embodiment of the disclosure.

FIG. 13 is a flowchart that illustrates a method for reducing quantum bit error rate in a quantum key distribution system in accordance with an advantageous embodiment of the disclosure. The method is generally designated by reference number 1300, and begins by transmitting a quantum key signal, for example, a laser pulse train by a transmitter at a first timing (Step 1302). The transmitted quantum key signal is received at a receiver of the QKD system (Step 1304), and is detected by an SPD at the receiver (Step 1306). An output of the SPD is then sampled at a second timing that is delayed with respect to the first timing (Step 1308). For example, the second timing is delayed with respect to the first timing such that a rise time of the output signal at a sampling time is contained inside a boundary defined by a preceding sampling time and a subsequent sampling time. The sampled output is then analyzed and processed in a conventional manner (Step 1310), and the method ends.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for transmitting optical clock signals and quantum key signals on a single optical channel in a quantum key distribution system, the method comprising:
   receiving a multi-photon optical clock signal at an electro-optic switch at a first clock rate;
   configuring the electro-optic switch for an interval defined by a second clock rate for generating a single photon quantum key signal;
   combining the multi-photon optical clock signal and the single photon quantum key signal to form a combined multi-photon optical clock signal and single photon quantum key signal; and
   transmitting the combined multi-photon optical clock signal and single photon quantum key signal on the single optical channel, wherein the single optical channel transmits the single photon quantum key signal at a first time interval and transmits the multi-photon optical clock signal at a second time interval.

2. The method according to claim 1, wherein the receiving, configuring and combining are performed at a transmitter, and wherein the transmitting comprises transmitting the combined multi-photon optical clock signal and single photon quantum key signal from the transmitter to a receiver on the single optical channel, wherein the transmitter and receiver are synchronized using the single optical channel.

3. The method according to claim 2, wherein transmitting the combined multi-photon optical clock signal and single photon quantum key signal from the transmitter to a receiver on the single optical channel, comprises:
   transmitting the combined multi-photon optical clock signal and single photon quantum key signal from the transmitter to the receiver on the single optical channel across free space.

4. The method according to claim 2, and further comprising:
   separating the combined multi-photon optical clock signal and single photon quantum key signal at the receiver;
   sending the separated multi-photon optical clock signal to a clock recovery unit; and
   sending the separated single photon quantum key signal to a single photon detector.

5. The method according to claim 4, and further comprising:
   synchronizing the transmitter and receiver using a correlation between a bit error rate of the single photon detector and a relative difference of addresses between the transmitter and the receiver.

6. The method according to claim 1, and further comprising:
   transmitting the second clock rate to the receiver via a wireless communications link to synchronize the transmitter and receiver.

7. The method according to claim 6, and further comprising:
   transmitting address information via the wireless communications link.

8. The method according to claim 1, wherein the first clock rate is a GHz clock rate and the second clock rate is a MHz clock rate.

9. A quantum key distribution system, comprising:
   a transmitter;
   a receiver; and
   a single optical channel for transmitting an optical clock signal and a quantum key signal from the transmitter to the receiver,
   the transmitter comprising:
      an optical source for generating an optical clock signal; and
      a first electro-optic switch on the transmitter for receiving the optical clock signal at a first clock rate and configurable for generating a single photon quantum key signal from the optical clock signal for transmission on the single optical channel at a first time interval and configurable for transmitting the optical clock signal on the single optical channel at a second time interval; and
   the receiver comprising:
      a second electro-optic switch on the receiver for receiving the single photon quantum key signal and the optical clock signal, the second electro-optic switch configurable for directing the single photon quantum key signal to a single photon detector at the first time interval and configurable for directing the optical clock signal to a clock recovery unit at the second time interval.

10. The quantum key distribution system according to claim 9, and further comprising:
a clock on the transmitter for transmitting frame frequency signals at a second clock rate to the first electro-optic switch on the transmitter and to the second electro-optic switch on the receiver, wherein the frame frequency signals are transmitted to the second electro-optic switch via a wireless communications link between the transmitter and the receiver.

11. The quantum key distribution system according to claim 10, wherein the first clock rate is a GHz clock rate and the second clock rate is a MHz clock rate.

12. The quantum key distribution system according to claim 9, wherein the single optical channel is across free space.

13. The quantum key distribution system according to claim 9, wherein the optical clock signal comprises a multi-photon optical clock signal.

14. The quantum key distribution system according to claim 13, wherein the second electro-optical switch is configured for separating the single photon quantum key signal and the multi-photon optical clock signal for directing the single photon quantum key signal to the single photon detector at the first time interval and for directing the multi-photon optical clock signal to the clock recovery unit at the second time interval.

15. A method for transmitting optical clock signals and quantum key signals on a single optical channel between a transmitter and a receiver in a quantum key distribution system, the method comprising:
combining a multi-photon optical clock signal and a single photon quantum key signal at the transmitter to provide a combined optical signal;
transmitting the combined optical signal from the transmitter to the receiver on the single optical channel, wherein the single photon quantum key signal is transmitted to the receiver at a first time interval and the multi-photon optical clock signal is transmitted to the receiver at a second time interval;
receiving the combined optical signal at the receiver;
separating the combined optical signal at the receiver to provide the multi-photon optical clock signal and the single photon quantum key signal at the receiver;
directing the single photon quantum key signal at the receiver to a single photon detector at the first time interval; and
directing the multi-photon optical clock signal at the receiver to a clock recovery unit at the second time interval.

16. The method according to claim 15, wherein transmitting the combined optical signal from the transmitter to the receiver on the single optical channel, comprises:
transmitting the combined optical signal from the transmitter to the receiver on the single optical channel across free space.

17. The method according to claim 15, wherein combining a multi-photon optical clock signal and a single photon quantum key signal at the transmitter to provide a combined optical signal, comprises:
receiving the multi-photon optical clock signal at an electro-optic switch at the transmitter at a first clock rate; and
configuring the electro-optic switch at the transmitter for an interval defined by a second clock rate for generating the single photon quantum key signal to provide the combined optical signal.

18. The method according to claim 17, wherein separating the combined signal at the receiver to provide the multi-photon optical clock signal and the single photon quantum key signal at the receiver, comprises:
separating the combined signal at an electro-optic switch at the receiver.

19. The method according to claim 17, and further comprising:
transmitting the second clock rate to the receiver via a wireless communications link to synchronize the transmitter and receiver.

20. The method according to claim 19, and further comprising:
synchronizing the transmitter and receiver by use of a correlation between a bit error rate of the single photon detector and a relative difference of addresses between the transmitter and the receiver.

21. A method for reducing quantum bit error rate in a quantum key distribution system, the method comprising:
transmitting a quantum key signal from a transmitter to a receiver at a first timing;
detecting the transmitted quantum key signal by a detector at the receiver; and
sampling an output signal of the detector at a second timing that is delayed relative to the first timing, the second timing being delayed relative to the first timing such that a rise time of the output signal at a sampling time is contained inside a boundary defined by a preceding sampling time and a subsequent sampling time.

22. The method according to claim 21, wherein transmitting a quantum key signal from a transmitter to a receiver at a first timing comprises:
transmitting the quantum key signal from the transmitter to the receiver across free space.

23. The method according to claim 21, wherein the quantum key signal comprises a laser pulse train.

24. The method according to claim 23, and further comprising:
generating the laser pulse train by a single mode Vertical Cavity Surface Emitting Laser driven by a data generator.

25. The method according to claim 21, wherein detecting the transmitted quantum key signal by a detector at the receiver, comprises:
detecting the transmitted quantum key signal by a single photon detector at the receiver.

26. The method according to claim 21, and further comprising:
analyzing the sampled output signal.

27. A quantum key distribution system, comprising:
a transmitter for transmitting a quantum key signal at a first timing, the transmitter comprising a photon source for generating the quantum key signal;
a receiver including a detector for detecting the transmitted quantum key signal; and
a sampling time delay mechanism for sampling an output signal of the detector at a second timing that is delayed relative to the first timing, wherein the sampling time delay mechanism delays the second timing relative to the first timing such that a rise time of the output signal at a sampling time is contained inside a boundary defined by a preceding sampling time and a subsequent sampling time.

28. The quantum key distribution system according to claim 27, wherein the photon source comprises a laser driven by a data generator.

29. The quantum key distribution system according to claim 28, wherein the laser comprises a single mode Vertical Cavity Surface Emitting Laser.

30. The quantum key distribution system according to claim 27, wherein the sampling time delay mechanism comprises one of a hardware sampling time delay mechanism and a software sampling time delay mechanism.

31. The quantum key distribution system according to claim 30, wherein the hardware sampling time delay mechanism comprises one of an electrical circuit and a physical delay line.

32. The quantum key distribution system according to claim 27, wherein the transmitter transmits the quantum key signal to the receiver across free space.

33. The quantum key distribution system according to claim 27, and further comprising:

an analyzer for analyzing the sampled output signal.

34. A method for reducing quantum bit error rate in a free space quantum key distribution system, the method comprising:

transmitting a quantum key signal from a transmitter across free space to a receiver at a first timing;

detecting the transmitted quantum key signal by a single photon detector at the receiver; and sampling an output signal of the single photon detector at a second timing that is delayed relative to the first timing, wherein the second timing is delayed relative to the first timing such that a rise time of the output signal at a sampling time is contained inside a boundary defined by a preceding sampling time and a subsequent sampling time.

35. The method according to claim 34, wherein the quantum key signal comprises a laser pulse train generated by a single mode Vertical Cavity Surface Emitting Laser driven by a data generator.

36. The method according to claim 34, and further comprising:

analyzing the sampled output signal.

* * * * *